Patented Oct. 9, 1951

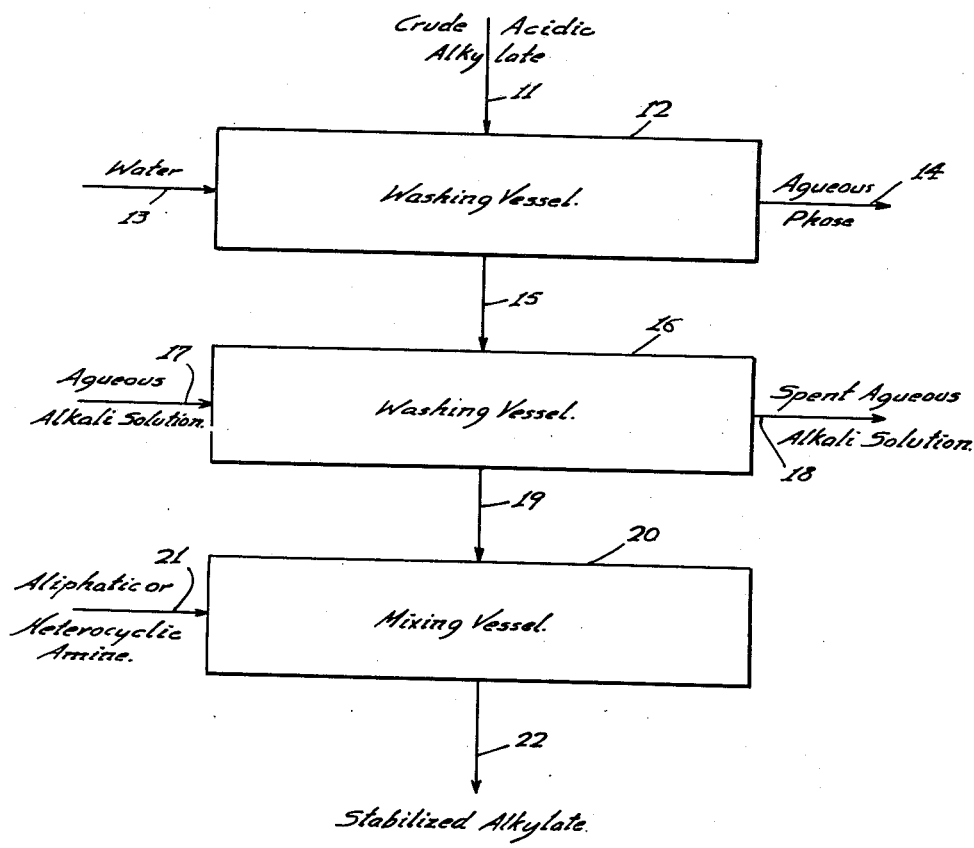

2,570,403

UNITED STATES PATENT OFFICE 2,570,403

STABILIZATION OF PHENOL ALKYLATES BY AMINES

Donald R. Stevens, Wilkinsburg, and Samuel C. Camp, Richland Township, Allegheny County, Pa., assignors to Gulf Research & Development Company, Pittsburgh, Pa., a corporation of Delaware Application October 31, 1949, Serial No. 124,723

19 Claims. (Cl. 202—57)

This invention relates to the stabilization of phenol alkylates, and it is particularly concerned with a method of inhibiting the dealkylation of alkylated phenols when they are subjected to temperatures normally causing dealkylation.

Phenol or its homologs, such as the cresols, xylenols, and ethyl phenols, are readily alkylated with olefins, particularly the tertiary olefins (olefins capable of forming tertiary alcohols on hydration) in the presence of a catalyst such as sulfonic acids; sulfuric acid; alkyl esters of sulfuric acid; aluminum chloride; hydrogen chloride; zinc chloride; boron trichloride; boron trifluoride; complexes of boron trihalides with water, ethers, alcohols, etc.; and phosphoric acid. The resulting crude alkylate, however, is acidic and will tend to undergo dealkylation at elevated temperatures unless the acid component is removed or its dealkylation-promoting tendency is inhibited. For example, when a mixture of meta- and para-cresol is alkylated with the isobutylene of a $C_4$ refinery gas cut in the presence of sulfuric acid, the resulting crude alkylate usually contains a mixture of mono- and di-tertiary-butyl para-cresol, and mono- and di-tertiary-butyl meta-cresol, together with some extraneous non-phenolic acidic materials such as sulfuric acid, mono-tert-butyl sulfate, mono-sec-butyl sulfate, di-sec-butyl sulfate, sulfonic acids, sulfones, and the like. The di-tertiary-butyl para-cresol is particularly useful as an antioxidant in petroleum products such as cracked gasoline, lubricating and insulating oils, greases, and the like. The di-tertiary-butyl meta-cresol is useful in the reclaiming of rubber, as a tackifier, and in the preparation of surface active agents, and also is a useful starting material in processes of chlorination, nitration, hydrogenation, vinylation, sulfurization, aldehyde condensation, and the like. The mono-tertiary-butyl cresols may be treated with sulfur dichloride to form rubber stabilizers or they can be recycled for further alkylation. Accordingly, it is desirable to fractionate the crude alkylate to obtain cuts predominating in a single phenolic compound.

Before the crude alkylate is fractionated, however, it must be stabilized against dealkylation because the non-phenolic acidic materials present in the alkylate act as dealkylation catalysts even at the temperature required for vacuum distillation. Stabilization of the alkylate is important, of course, not only when the alkylate is subjected to fractional distillation but also when the alkylate is subjected to temperatures normally causing dealkylation in the presence of small amounts of acidic materials. Such temperatures are often encountered when the alkylate is used as a chemical intermediate.

We have found that an alkylate stabilized against dealkylation at elevated temperatures can be obtained by treating the crude acidic alkylate in steps comprising washing the acidic alkylate with a non-acid aqueous medium and intimately contacting the washed alkylate with at least the stoichiometric quantity of an alkaline agent necessary to neutralize the extraneous non-phenolic acidic matter in said washed alkylate, said alkaline agent selected from the group consisting of aliphatic and heterocyclic amines. By heterocyclic amine we mean a cyclic compound containing a nitrogen atom in the ring. Atoms other than carbon and nitrogen may also be present in the ring.

The first step of the process, i. e., washing of the acidic alkylate with a non-acid aqueous medium, removes the water-soluble and easily neutralizable materials from the alkylate, such as free sulfuric acid, mono-tert-alkyl sulfates, mono-sec-alkyl sulfates, and sulfonic acids. In the second step, the washed alkylate is contacted with an aliphatic or heterocyclic amine whereby the dealkylation-promoting tendency of the remaining acidic bodies consisting of the more refractory materials such as di-sec-alkyl sulfates, sulfones, and the like, is inhibited.

In the first step of the process, we use a neutral or basic aqueous material which effectively removes the water-soluble and the easily neutralizable acidic material from the acid alkylate. Naturally, if the alkylated phenol is soluble in, or reacts with, dilute aqueous alkali solutions, we will employ only water for washing purposes in the first step. However, in the case of meta- or para-cresol, the alkylated derivatives are not soluble in and do not react with dilute aqueous alkali solutions so that the crude acidic alkylated cresols can be washed with either water or dilute aqueous alkali solutions. For example, we have found that water and dilute solutions of aqueous caustic soda produce good results. Aqueous solutions of other alkalies, such as potassium hydroxide and ammonium hydroxide, can also be used. In some instances where the alkylate is strongly acid, an economic procedure to follow is to wash the alkylate first with water and then with a dilute aqueous alkali solution, i. e., aqueous 5 to 10 per cent alkali solution. The amount of solution used will vary depending upon the acid content of the alkylate, but is such that the aqueous layer separating after the washing is slightly alkaline.

The washing step can be readily carried out either in batch or continuous operation either at room temperature or at an elevated temperature. In batch operation the acidic phenol alkylate is introduced into a vessel along with a suitable quantity of the non-acid aqueous solution. The alkylate and the aqueous solution are then agitated together for a time sufficient to remove the water-soluble and the easily neutralizable acidic material. The mixture is then allowed to settle and the aqueous phase is separated from the non-aqueous phase. If desired, this washing step may be repeated. The non-aqueous phase, herein referred to as the "washed alkylate," is then intimately contacted with the aliphatic or heterocyclic amine.

The second step comprising contacting the washed alkylate with the aliphatic or heterocyclic amine can be carried out either in batch or continuous operation either at room temperature or at an elevated temperature. The amount of the amine required in this step ordinarily is sufficiently small, usually less than about 1 per cent based on the weight of the alkylate, so that its presence is not objectionable when the alkylate is subjected to distillation or when the alkylate is used as a chemical intermediate. Accordingly, the alkaline agent ordinarily need not be removed from the treated alkylate.

The exact manner in which the alkaline agents function in stabilizing the alkylate in step two of our process is not certain; therefore, we do not wish to limit our invention with respect to theory. It is believed, however, that the stabilizing efficiency of the alkaline agents depends to some extent upon their solubility in the alkylate, thus bringing the alkaline agent and the residual acidic material into the same phase. Although the net result of their action on an alkylate should be equivalent to complete neutralization, it is not certain that this condition has actually been brought about. Therefore, in referring to the treated alkylate we prefer to call it a stabilized alkylate rather than a neutralized alkylate.

The alkaline agents which we use in the second step of our process include the aliphatic and heterocyclic amines such as methylamine, dimethylamine, trimethylamine, ethylamine, diethylamine, triethylamine, n-propylamine, di-n-propylamine, tri-n-propylamine, n-butylamine, n-amylamine, n-hexylamine, laurylamine, ethylenediamine, ethanolamine, diethanolamine, triethanolamine, dicyclohexylamine, pyridine, piperidine, alpha-picoline, morpholine, benzyltrimethylammoniumbutoxide, and the like.

In order to obtain an indication of the amount of the acidic material present in the alkylate, we have resorted to the use of the saponification number test (ASTM D94–41T) commonly used for determining the saponifiable material in animal, vegetable or mineral oils. The saponification number, however, does not necessarily give an accurate indication of the amount of the non-phenolic acidic material present in any alkylated phenol. For example, if phenol itself is alkylated, a portion of the alkylated product may react with the caustic potash used in carrying out the saponification number test with the result that a higher saponification number would be obtained. In general, however, the increase in the saponification number resulting from the reaction of the phenolic material with the alkali is so small that it can be disregarded. It should be understood, however, that the stoichiometric amount of alkaline agent required in step two should be based upon the amount theoretically required to neutralize the extraneous non-phenolic acidic material in the alkylate.

When the alkylate introduced into step one contains non-phenolic acidic material in an amount sufficient to give a saponification number of about 15 or 20, the alkylate is advantageously washed until the saponification number is reduced to about 2. While the washing need not be carried out to this extent, it is desirable to reduce the acidity of the alkylate in the first step as much as can be conveniently accomplished in order to reduce the amount of the amine required in the second step. Depending upon the degree of washing in the first step, we may employ between about one and about three times the stoichiometric quantity of alkaline agent in the second step. More than three times the theoretical amount of alkaline agent can be used, but from an economic standpoint it is not desirable to use more than the least amount required to effect complete stabilization. In commercial practice the extent of the washing depends upon the relative cost of the washing as compared with the cost of the additional amount of alkaline agent required when the acidity of the alkylate is not reduced as much as possible by the washing step.

The stabilization of crude acidic alkylate may be readily understood by reference to the drawing which illustrates diagrammatically one embodiment of our invention.

Referring to the drawing, crude acidic alkylate is introduced by line 11 into washing vessel 12. Water is then introduced into vessel 12 by line 13. After thoroughly agitating the mixture of water and alkylate, the mixture is allowed to stand to effect separation into an aqueous phase and an alkylate phase. The aqueous phase is withdrawn through line 14.

The alkylate phase passes from washing vessel 12 by line 15 into washing vessel 16. In this vessel the alkylate is washed with an aqueous 5 to 10 per cent alkali solution introduced by line 17. After thorough agitation the mixture is allowed to stand to effect separation into a spent aqueous alkali phase and an alkylate phase. Spent aqueous alkali is withdrawn through line 18 and washed alkylate is withdrawn through line 19.

Washed alkylate from line 19 is introduced into a suitable mixing vessel 20 wherein the alkylate is contacted with an aliphatic or heterocyclic amine introduced by line 21. After thoroughly mixing the alkylate and amine, stabilized alkylate is withdrawn through line 22. The alkylate thus obtained is stabilized against dealkylation at elevated temperatures and can be subjected without further treatment to distillation or used per se as a chemical intermediate.

The effectiveness of stabilizing crude alkylate in steps comprising washing the alkylate with a non-acid aqueous medium and then contacting the washed alkylate with an aliphatic or heterocyclic amine will be demonstrated by the following dealkylation test in which a given amount of treated alkylate is subjected to fixed dealkylation heating conditions so that the results in a series of tests are directly comparable.

In carrying out this test, 10 grams of treated alkylate are placed in a glass chamber of about 50 milliliter capacity surrounded by a bath of vapors from boiling nitrobenzene. The chamber is connected through a condenser to a gasometer filled with saturated salt water for collecting the gas evolved. In this way the extent of the dealkylation occurring is indicated by the volume of gas collected in the gasometer, which corresponds to the volume of salt water displaced. In this test the alkylate is heated at about 205° C. for two hours, and the volume of gas collected at the end of 30, 60, and 120 minutes is noted and recorded. The recorded figures thus give numerical values which can conveniently be used to compare and evaluate the respective stabilization efficiency of different stabilizing procedures.

In the application of the above test to commercial practice an alkylate is considered to be completely stabilized when the amount of gas collected between 30 and 120 minutes (Δ120–30) is zero. In strongly acidic alkylates, however, substantial dealkylation may take place in the first 30 minutes, in which case the amount of gas collected during the next 90 minutes may be small. Thus in evaluating the stabilization efficiency of a particular stabilizing process the Δ120–30 value should be considered in connection with the volume of gas collected during the first 30 minutes. For instance, a 10 gram portion of an acidic di-tertiary-butyl cresol may have a Δ120–30 value as low as 90, but the volume of gas given off in the first 30 minutes may be as much as 1750 cc., indicating almost complete dealkylation. Theoretically, a 10 gram portion of a di-tertiary-butyl cresol should upon dealkylation produce about 1900 cc. of isobutylene.

Even with stabilized alkylates some gas is collected at the start of the test as a result of the expansion of air dissolved in, or introduced along with, the sample, and also from expansion of residual moisture contained in the alkylate. To determine what portion of the initial gas collected may result from the expansion of air in the heating zone of the dealkylation apparatus, a 10 gram sample of pure 2,6-di-tertiary-butyl para-cresol was introduced and heated. At the end of 120 minutes, 40 cc. of gas had collected. The 40 cc. of gas collected is thus considered to be a measure of the air introduced into the system along with the sample. To determine what portion of the initial gas may result from the combined air and moisture content, a 10 gram sample of alkylate was treated by refluxing for several hours in 100 grams of absolute alcohol containing 10 grams of potassium hydroxide. The alkylate was then water-washed and allowed to stand overnight in a desiccator containing $P_2O_5$. A measurement in the dealkylation apparatus showed 120.0 cc. of gas evolved in 30 minutes and 137.0 cc. at the end of 120 minutes. The 137 cc. of gas is considered to correspond to the air and moisture content introduced with the sample. Accordingly, in the following examples gas volumes higher than about 140 cc. may be considered to be isobutylene.

In the following specific examples the alkylate was obtained by alkylating a close-boiling meta-para-cresol mixture with the isobutylene contained in a refinery $C_4$ cut using 5 per cent of concentrated sulfuric acid as the catalyst. The alkylate thus obtained had a saponification number of 15.1. The alkylated derivatives of the cresols do not react with, and are not soluble in, dilute aqueous alkali solutions; therefore, this saponification number is considered to be an accurate indication of the nonphenolic acidic material present in the alkylate. Likewise, in the following examples the saponification numbers of the alkylated cresols are an accurate measurement of the non-phenolic acidic material present.

*Example 1*

In this example a sample of the alkylate having a saponification number of 15.1 was washed at room temperature with an excess of aqueous 10 per cent NaOH. The washed alkylate had a saponification number of 1.7. When the alkylate was subjected to the above-described dealkylation test there were 714.0 cc. of gas collected in 30 minutes and 1582.0 cc. of gas collected at the end of 120 minutes. From this it is evident that the alkylate washed only with an excess of 10 per cent NaOH is not completely stabilized.

*Example 2*

In the series of experiments reported in this example, the washed alkylate obtained as described in Example 1 was treated with the various amines at 95° C. with stirring for 30 minutes. In the following experiments a 50 per cent excess of the theoretical requirement of the amine was used. Equally good stabilization can be effected, however, by employing the theoretical amount as will be shown in Example 4. The results obtained when the treated alkylates were subjected to the dealkylation test are given in the following table.

| Experiment No. | Amine | Wt. of Amine per 10 grams Alkylate | Per Cent Amine | Times Theoretical | Gas Collected (cc.) | | | Δ120–30 |
|---|---|---|---|---|---|---|---|---|
| | | | | | 30 min. | 60 min. | 120 min. | |
| 1 | None | 0.0 | | | 714.0 | 1,143.0 | 1,582.0 | 868.0 |
| 2 | Pyridine | 0.0363 | 0.36 | 1.5 | 140.0 | 165.0 | 215.0 | 75.0 |
| 3 | Piperidine | 0.0427 | 0.43 | 1.5 | 129.0 | 130.0 | 130.0 | 1.0 |
| 4 | Alpha-picoline | 0.0623 | 0.62 | 1.5 | 135.0 | 137.0 | 143.0 | 8.0 |
| 5 | Dicyclohexylamine | 0.1212 | 1.21 | 1.5 | 102.0 | 105.0 | 105.0 | 3.0 |
| 6 | Diethylamine | 0.0489 | 0.49 | 1.5 | 100.0 | 102.0 | 102.0 | 2.0 |
| 7 | Morpholine | 0.0583 | 0.58 | 1.5 | 127.0 | 131.0 | 131.0 | 4.0 |
| 8 | Benzyl Trimethyl Ammonium Butoxide | 0.1361 | 1.36 | 1.5 | 172.0 | 172.0 | 172.0 | 0.0 |

It can be seen from the above data that substantial dealkylation occurred (Experiment No. 1) when the alkylate was washed with excess aqueous NaOH but not treated with an amine. It is further shown that when the alkylate was treated with one and one-half times the theoretical amount of amine required to effect neutralization, remarkably improved results were obtained. While treatment with pyridine (Experiment No. 2) did not completely inhibit dealkylation of the alkylate as evidenced by the Δ120–30 value of 75, the pyridine treatment produced an alkylate having remarkably improved resistance to dealkylation over the untreated alkylate. The large amount of gas collected during the first 30 minutes in Experiments 2 to 8 is considered to result largely from the air and moisture content introduced with the sample.

Example 3

In this example crude alkylate having a saponification number of 15.1 was treated in accordance with Example 1. The washed alkylate in this instance, however, had a saponification number of 2.5. When the alkylate was subjected to the dealkylation test, 1616.0 cc. of gas collected in 30 minutes and 1820 cc. of gas collected at the end of 120 minutes. From this it is evident that the washed alkylate substantially dealkylated during the test. While the Δ120-30 value for this alkylate was only 204.0 as compared with 868.0 for Example 1, the alkylate having a saponification number of 2.5 actually dealkylated to a greater extent. When a 10 gram sample of the alkylate having a saponification number of 2.5 was treated with 0.32 gram of diethanolamine in accordance with the procedure outlined in Example 2, only 120.0 cc. of gas collected in 30 minutes and only 127.0 cc. of gas collected at the end of 120 minutes. The Δ120-30 value for the alkylate treated with diethanolamine accordingly was 7, indicating substantially complete stabilization of the alkylate. A considerable excess (7.3 times the theoretical requirement) of the diethanolamine was used in this example without deleteriously affecting the stabilization of the alkylate. The theoretical amount could have been used, as will be illustrated in the following example.

Example 4

In this example crude alkylate having a saponification number of 15.1 was washed at room temperature with an excess of aqueous 10 per cent NaOH. The washed alkylate had a saponification number of 1.2. A sample of the washed alkylate was then treated with a theoretical amount of diethanolamine at 95° C. for 30 minutes. Another sample of the washed alkylate was treated under the same conditions with a theoretical amount of dicyclohexylamine. The results obtained when the treated alkylates were subjected to the dealkylation test are given in the following table.

| Wt. of Amine per 10 grams Alkylate | Times Theoretical | Gas Collected (cc.) | | | Δ120-30 |
|---|---|---|---|---|---|
| | | 30 min. | 60 min. | 120 min. | |
| 0.0 | | 402.0 | 798.0 | 1,185.0 | 783.0 |
| 0.0225 diethanolamine | 1.0 | 111.0 | 111.0 | 111.0 | 0.0 |
| 0.082 dicyclohexylamine | 1.0 | 117.0 | 117.0 | 117.0 | 0.0 |

It can be seen that substantially complete stabilization was obtained by treating the alkylate with the theoretical amounts of diethanolamine and dicyclohexylamine at 95° C. for 30 minutes. The 111 cc. and 117 cc. of gas collected during the dealkylation test are considered to result largely from the air and moisture introduced with the sample.

While the invention has been described herein with particular reference to certain embodiments and specific examples by way of illustration, it is to be understood that the invention is not limited to such embodiments and specific examples except as hereinafter defined in the appended claims.

We claim:

1. A method of inhibiting the dealkylation of crude acidic alkylated phenols at elevated temperatures which comprises washing said alkylated phenols with a non-acid aqueous medium and adding to the washed alkylate at least the stoichiometric quantity of an alkaline agent necessary to neutralize the extraneous non-phenolic acidic matter in said washed alkylate, said alkaline agent selected from the group consisting of aliphatic and heterocyclic amines.

2. A method of inhibiting the dealkylation of crude acidic alkylated phenols at elevated temperatures which comprises washing said alkylated phenols with water and adding to the washed alkylate at least the stoichiometric quantity of an alkaline agent necessary to neutralize the extraneous non-phenolic acidic matter in said washed alkylate, said alkaline agent selected from the group consisting of aliphatic and heterocyclic amines.

3. In the process of separating crude acidic alkylated phenols by fractional distillation the improvement which comprises washing said alkylated phenols prior to distillation with a non-acid aqueous medium and adding to the washed alkylate at least the stoichiometric quantity of an alkaline agent necessary to neutralize the extraneous non-phenolic acidic matter in said washed alkylate, said alkaline agent selected from the group consisting of aliphatic and heterocyclic amines.

4. A method of stabilizing an acidic phenol alkylate which comprises washing said alkylate with a non-acid aqueous medium and intimately contacting the washed alkylate with at least a stoichiometric quantity of an alkaline agent necessary to neutralize the extraneous non-phenolic acidic matter in said washed alkylate, said alkaline agent selected from the group consisting of aliphatic and heterocyclic amines.

5. The method of claim 4 wherein the non-acid aqueous medium consists of water.

6. The method of claim 5 wherein the alkaline agent is an aliphatic amine.

7. The method of claim 6 wherein the aliphatic amine is an ethanolamine.

8. The method of claim 6 wherein the aliphatic amine is dicyclohexylamine.

9. The method of claim 5 wherein the alkaline agent is a heterocyclic amine.

10. The method of claim 4 wherein the non-acid aqueous medium is a dilute aqueous alkali solution.

11. The method of claim 10 wherein the alkaline agent is an aliphatic amine.

12. The method of claim 11 wherein the aliphatic amine is an ethanolamine.

13. The method of claim 11 wherein the aliphatic amine is dicyclohexylamine.

14. The method of claim 10 wherein the alkaline agent is a heterocyclic amine.

15. A method of stabilizing an acidic phenol alkylate which comprises washing said alkylate with water, separating the non-aqueous phase from the aqueous phase, washing the non-aqueous phase with a dilute aqueous alkali solution and contacting the alkali-washed alkylate with at least the stoichiometric quantity of an alkaline agent necessary to neutralize the extraneous non-phenolic acidic matter in said washed alkylate, said alkaline agent selected from the group consisting of aliphatic and heterocyclic amines.

16. The method of claim 15 wherein the alkaline agent is an aliphatic amine.

17. The method of claim 16 wherein the aliphatic amine is an ethanolamine.

18. The method of claim 16 wherein the aliphatic amine is dicyclohexylamine.

19. The method of claim 15 wherein the alkaline agent is a heterocyclic amine.

DONALD R. STEVENS.
SAMUEL C. CAMP.

REFERENCES CITED

The following references are of record in the file of this patent:

UNITED STATES PATENTS

| Number | Name | Date |
|---|---|---|
| 1,933,064 | Kyrides | Oct. 31, 1933 |
| 2,310,663 | Weinrich et al. | Feb. 9, 1943 |